Jan 6, 1931.      L. H. ZEUN      1,787,967
TOOTH STRUCTURE FOR TOBACCO STEMMING MACHINES
Filed March 9, 1928
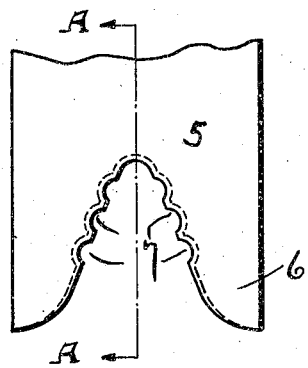  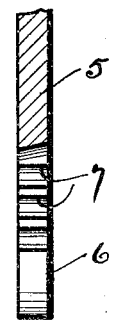
Fig. 1          Fig 2
INVENTOR.
BY
ATTORNEY.

Patented Jan. 6, 1931

1,787,967

UNITED STATES PATENT OFFICE

LOUIS H. ZEUN, OF CATONSVILLE, MARYLAND, ASSIGNOR OF ONE-THIRD TO JOHN B. ADT AND ONE-THIRD TO ALBERT W. ADT, BOTH OF BALTIMORE, MARYLAND

TOOTH STRUCTURE FOR TOBACCO-STEMMING MACHINES

Application filed March 9, 1928. Serial No. 260,357.

This invention relates to certain improvements in tobacco stemming and stripping machines, and particularly to that type of machine including yieldable teeth, constituting the stripping means for taking the leaf from the stems.

The particular object of this invention is the provision of equipping the opposing faces of the toothed portion of the teeth with corrugations, which positively permits the leaves to be easily and quickly severed from the stems without binding during such stripping action.

A further object of this invention is the provision of equipping the opposing faces of the toothed portion of the yieldable members with a series of superposed corrugations, constituting a severing means whereby the leaf may be easily and quickly severed from the stem during the stripping action.

A still further object of this invention is the provision of corrugating the toothed portions of the yieldable members so as to provide a means whereby the stripping action in separating the leaf from the stem may be positively assured.

A still further object of this invention is the provision of a plurality of teeth having one end provided with a forked portion, the opposing faces of which forked portion is provided with corrugations, constituting a severing means for easily separating the leaf from tobacco stems when placed therein or therethrough.
With these and other objects in view, the invention consists in certain novel features, combination and arrangement of parts as will be hereinafter more fully described, illustrated in the accompanying drawing, and claimed.

In the drawing,

Figure 1 is a fragmentary plan elevational view, illustrating my improved tooth, as made in accordance with this invention;
Figure 2 is a vertical longitudinal sectional view, taken on the line A—A of Figure 1; and, Figure 3 is a top plan view of my improved tooth.
Heretofore in stripping machines, it has been found that in the use of some tobacco, the leaf is harder to sever from the stem, and consequently sets up a binding action during the stripping action of the passing of the stem through the stripping teeth. This is particularly true in the tooth structure, illustrated and described in my co-pending applications, Serial Nos. 210,490, 246,462, and 256,397, filed August 4, 1927, January 13, 1928, and February 23, 1928, respectively, and application executed March 2, 1928. In each of these co-pending applications, the yieldable members, constituting the stripping means, which embodies a series of teeth, have the opposing faces of their forked ends smooth and it is the aim of the present invention to relieve the objection to these teeth by providing them with corrugations or depressions, as will be hereinafter more fully described.

As this tooth is particularly adapted for the above entitled applications, its mode of assembly is not described, as it is believed that reference to the parent applications is sufficient without further discussion, as to the particular construction of assembly.

In the present invention, referring to the drawing in detail, the numeral 5 indicates a body of a tooth, which in the co-pending applications is connected in series to form an endless unit of independently yieldable teeth.

Each of the bodies 5 have one of their ends provided with a forked portion 6, which forked portion has its opposing walls corrugated, as at 7.

The corrugations 7 are arranged in superposed relation on each wall and extend transversely through and beyond each side face or for the entire thickness of the body.

As clearly set forth, the purpose of the corrugations is to provide a means whereby the stripping action, or the severing of the leaves from the stems without binding will be assured, and this is accomplished by the corrugations, due to the fact that the corrugations will sever the leaves quickly and easily from the stems during the passage of the stem through the forked portion of each tooth.

In use, when the leaves are fed to a tobacco stripping machine, the butt ends of said leaves are grasped individually by the forked portions of the teeth, and as shown in the co-pending application, the smooth walls of the teeth permitted the leaves to bind rather than strip the same from their stems, and to overcome this serious objection the forked portion of the teeth was provided with transverse corrugations, which act as cutting edges to sever the fibers of the leaves from the stems, so as to permit them to be freely and quickly severed during the stripping action, or passage of the stem through the forked portion of the teeth. This structure also eliminates and prevents binding of the leaves in the forked portion during the stripping operation.

The particular type of stripping machine to which this invention is applicable, forms no part of this application, as the tooth structure is capable of being used on any type of stripping machine, wherein teeth are used as strippers and carriers.

Having thus described my invention, what I claim as new is:

A tooth for tobacco stemming machines, comprising a body having one end forked, said forked end of said tooth provided on its opposing inner faces with a series of corrugations, constituting a severing means during the stripping action of tobacco leaves.

In testimony whereof he hereunto affixes his signature.

LOUIS H. ZEUN.